United States Patent [19]

Rajasekaran et al.

[11] Patent Number: 4,712,242
[45] Date of Patent: Dec. 8, 1987

[54] SPEAKER-INDEPENDENT WORD RECOGNIZER

[75] Inventors: Periagaram K. Rajasekaran; George R. Doddington, both of Richardson; Thomas B. Schalk, Dallas, all of Tex.

[73] Assignee: Texas Instruments Incorporated, Dallas, Tex.

[21] Appl. No.: 484,730

[22] Filed: Apr. 13, 1983

[51] Int. Cl.$^4$ .............................................. G10L 5/00
[52] U.S. Cl. ..................................................... 381/42
[58] Field of Search ............................ 381/42, 43, 45; 364/513.5, 900

[56] References Cited

U.S. PATENT DOCUMENTS

| 3,940,565 | 2/1976 | Lindenberg | 179/1 SA |
| 4,016,544 | 4/1977 | Morita et al. | 364/900 |
| 4,084,260 | 4/1978 | Fleming et al. | 364/900 |
| 4,085,447 | 4/1978 | Pertl et al. | 364/900 |
| 4,107,460 | 8/1978 | Grunza et al. | 381/43 |
| 4,388,495 | 6/1983 | Hitchcock | 381/43 |
| 4,446,531 | 5/1984 | Tanaka | 381/42 |
| 4,528,688 | 7/1985 | Ichikawa et al. | 381/43 |
| 4,559,604 | 12/1985 | Ichickawa et al. | 381/43 |

OTHER PUBLICATIONS

Rabiner, Digital Processing of Speech Signals, Prentice Hall, 1978, pp. 491-498.

Primary Examiner—E. S. Matt Kemeny
Attorney, Agent, or Firm—William E. Hiller; N. Rhys Merrett; Mel Sharp

[57] ABSTRACT

Speaker-independent word recognition is performed, based on a small acoustically distinct vocabulary, with minimal hardware requirements. After a simple preconditioning filter, the zero crossing intervals of the input speech are measured and sorted by duration, to provide a rough measure of the frequency distribution within each input frame. The distribution of zero crossing intervals is transformed into a binary feature vector, which is compared with each reference template using a modified Hamming distance measure. A dynamic time warping algorithm is used to permit recognition of various speaker rates, and to economize on the reference template storage requirements. A mask vector with each reference vector on a template is used to ignore insignificant (or speaker-dependent) features of the words detected.

16 Claims, 7 Drawing Figures

○ DETERMINE THE FEATURE VECTOR AT THE REFERENCE TIMES FOR EACH SAMPLE

| 0 | 1 | 1 | 0 | 0 | 0 | 1 | 0 | 1 | — — | SAMPLE 1 FV |
|---|---|---|---|---|---|---|---|---|-----|-------------|
| 1 | 0 | 0 | 0 | 1 | 1 | 1 | 0 | 0 | — — | SAMPLE 100 FV |

ADD COLUMNWISE

| 3 | 57 | 96 | 97 | 41 | 98 | 95 | 33 | — — | SUM VECTOR |
|---|----|----|----|----|----|----|----|-----|------------|

(BEHAVIOR DISTRIBUTION)

○ CHOOSE AN "UNANIMITY FACTOR" — E.G. 93%

| 0 | X | 1 | 1 | X | 1 | 1 | X | — — | RF(1) REFERENCE VECTOR |
|---|---|---|---|---|---|---|---|-----|------------------------|
| 1 | 0 | 1 | 1 | 0 | 1 | 1 | 0 | — — | RM(1) MASK VECTOR |

(SIGNIFICANT GROUP BEHAVIOR)

SPEAKER-INDEPENDENT WORD RECOGNIZER

BACKGROUND AND SUMMARY OF THE INVENTION

The present invention relates to a speaker-independent speech recognizer, that is to a machine capable of automatically recognizing and decoding speech from an unknown human speaker.

There are many applications where it would be highly desirable to have such a speaker-independent speech recognizer configured for a small vocabulary. For example, such a word recognizer would be extremely useful for automotive controls and video games. If even a very small control vocabulary were available, many non-critical automotive control functions which frequently require the driver to remove his eyes from the road could be done by direct voice inputs. Control of a car's radio or sound system could be usefully accomplished in this matter. The more sophisticated monitoring and computational functions available in some cars could also be more efficiently met with a voice query/voice output system. For example, if a driver could say "fuel", and have his dashboard reply verbally "seven gallons—refuel within 160 miles," this would be very convenient in automotive control design. Similarly, an arcade video game could be designed to accept a limited set of verbal inputs such as "shoot", "pull up", "dive", "left", and "right". These applications, like many others, are extremely cost sensitive.

Thus, to provide a word recognizer for the large body of applications of this type, it is not necessary that the recognizer be able to recognize a very large vocabulary. A small vocabulary, e.g. 6 to 20 words, can be extremely useful for many applications. Secondly, it is not necessary that a word recognizer a for such applications be able to recognize word embedded in connected speech. Recognition of isolated words is quite sufficient for many simple command applications. Third, in many such applications, substitution errors are much more undesirable than rejection errors. For example, if a consumer is making purchases from a voice-selected vending machine, it is much more desirable to have the machine reply "input not understood" than to have the machine issue the wrong item.

Thus, it is an object of the present invention to provide a low cost word recognizer system which has a very low rate of substitution errors.

It is highly desirable to have such word recognizer systems operate with a low computational load. In many attractive applications, a modest error rate can easily be tolerated (e.g. 85% accurate recognition), but the cost requirements are stringent. Thus, it would be highly desirable to have a word recognizer which could be implemented with an ordinary cheap 8 bit microcomputer, together with cheap analog chips, but without requiring any high speed chips or dedicated processors. Of course, it is always possible to do speaker-independent word recognition using a minicomputer or a main frame, but such an implementation has no practical relevance to most of the desirable applications, since most of the applications are cost-sensitive.

Thus, it is an object of the present invention to provide a speaker-independent word recognizer which can be implemented with an ordinary 8-bit microcomputer, and does not require any high-speed or special-function processing chips.

It is a further object of the present invention to provide a speaker-independent word recognizer for a limited vocabulary which can be implemented using an 8-bit microcomputer and analog chips.

A further problem in speaker-independent recognition has been the preparation of an appropriate set of templates. Any one speaker, or any set of speakers with a common regional accent, may pronounce a certain word consistently with certain features which will not be replicated in the general population. That is, the reference templates for speaker-independent vocabulary must not specify any feature of a word which is not a strictly necessary feature. It is always possible to prepare a set of reference templates using empirical optimization, but this can be immensely time consuming, and also precludes the possibility of user-generation of reference templates in the field.

Thus, it is a further object of the present invention to provide a speech recognizer, for which the preparation of reference templates requires minimal empirical input from trained researchers.

It is a further object of the present invention to provide a method for preparing vocabulary templates for a speaker-independent word recognizer which can be implemented by minimally skilled users.

A further difficulty in preparing a speaker-independent word recognizer for cost-sensitive systems is memory requirements. That is, it is highly desirable in many systems where small microcomputers are to be used not to tie up too much program memory with the word recognition algorithm and templates. In particular, in many applications for portable devices (e.g. a calculator or watch which can receive spoken commands), the power requirements of unswitched memory impose a critical constraint. Since speech vocabulary templates must be saved during power-off periods, the amount of memory (CMOS or nonvolatile) required for speech reference templates is a very important cost parameter.

Thus, it is a further object of the present invention to provide a speaker-independent word recognizer which has absolutely minimal memory requirements for storing reference templates.

A further problem in any word recognizer, which is most particularly important in a speaker-independent word recognizer, is that speakers will typically vary, not only in their average rate of speech, but in their timing of the syllable within a given word. Since this information is not normally used by human listeners in making a word recognition decision, it will typically vary substantially among the speech patterns of different speakers. It is therefore necessary that a speaker-independent word recognizer be insensitive to a reasonable range of variation in the average rate and localized timing of human speech.

It is therefore a further object of the present invention to provide a speaker-independent word recognizer which is reasonably insensitive both to average rate and to localized variations in timing of human speech.

It is a further object of the present invention to provide a speech recognition system which is reasonably insensitive both to average rate and to localized variations in timing of human speech, which can be implemented using a simple microcomputer with no expensive custom parts required.

A further characteristic which it would be desirable to implement in a speaker-independent word recognition system is the capability for vocabulary change. Thus, for example,in a calculator which can be addressed by spoken commands, it would be desirable to have the set of spoken commands be variable with different modules (for example),or to be user variable as user-customized software is loaded into the calculator.

However, to accomplish this, it is desirable that the reference template set preparation be baed on reasonably simple exclusion algorithms, so that a reasonably unskilled user can prepare a new template set. It is also necessary that the template set be addressable, so that templates can be downloaded and substituted.

It should also be noted that the capability to change templates is sensitive to the memory space required for each template. That is, if the memory templates can be stored reasonably compactly, then a mask location can be used to indicate which subset of all possible stored templates corresponds to the currently active vocabulary. Thus, for example, in an automotive control system, a master vocabulary might contain only a set of words indicating various areas of control functions, such as "radio", "wipers", "engine", "computer", etc. After any one of these function areas have been selected, a new localized set of reference templates would then be used for each particular function area. Each localized set of reference templates would have to include one command to return to the master template set, but otherwise could be fully customized. Thus, a localized set of commands for radio control could include such commands as "FM", "AM", "higher", "lower", "frequency", "volume", etc.

Thus, it is a further object of the present invention to provide a speaker-independent recognizer which functions on a limited vocabulary, but in which the vocabulary set can be esily changed.

It is a further object of the present invention to provide a speaker-independent recognizer which functions on a limited vocabulary, but in which the vocabulary set can be easily changed, which can be implemented using simple commercially available microcomputer parts.

A further desirable option in speaker-independent word recognizer systems is the capability to function in a speaker-dependent mode. That is, in such applications as automobile controls or speech-controlled calculators, it is necessary that the systems be shipped from the factory with a capability to immediately receive speech input. However, many such devices will typically be used only by a limited set of users. Thus, it is desirable to be able to adapt the template set of a speaker-independent device to be optimized for a particular user or group of users. Such re-optimization could be used to increase the vocabulary size or lower the error rate in service, but requires that the process of modifying templates be reasonably simple.

Thus, it is a further object of the present invention to provide a speaker-independent word recognizer which can be re-optimized easily to operate in a speaker dependent mode, for a specific speaker or for a limited group of speakers.

Thus, it is a further object of the present invention to provide a speaker-independent word recognizer, which can be easily re-optimized to operate in a speaker dependent mode for a specific speakder or for a limited group of speakers, and which can be economically configured using a simple microcomputer and simple analog parts.

Speaker-independent word recognition is performed, based on a small acoustically distinct vocabulary, with minimal hardware requirements. After a simple preconditioning filter, the zero crossing intervals of the input speech are measured and sorted by duration, to provide a rough measure of the frequency distribution within each input frame. The distribution of zero crossing intervals is transformed into a binary feature vector, which is compared with each reference template using a modified Hamming distance measure. A dynamic time warping algorithm is used to permit recognition of various speaker rates, and to economize on the reference template storage requirements. A mask vector for each reference template is used to ignore insignificant (speaker-dependent) features of the words detected.

To achieve these and other objects of the invention, the present invention comprises:

A word recognizer, comprising:

input means for receiving an analog speech input signal;

a signal conditioner connected to said input means, said signal conditioner measuring said input signal to provide a sequence of feature vectors at predetermined frame intervals;

distance measurement means, connected to said signal conditioner, for comparing each said feature vector with each of a plurality of reference vectors, said reference vectors being organized in sequences, each said reference vector sequence corresponding to a word which can be recognized, to provide a distance measure with respect to each of said reference vectors for each successive one of said feature vectors;

means for recognizing words in accordance with said distance measures between each said sequence of said reference vectors and successive ones in said sequence of feature vectors;

each said sequence of reference vectors having a mask vector associated therewith, said distance measurement means ignoring elements of each said reference vector which are designated as "don't care" bits by said corresponding mask vector.

According to a further embodiment of the present invention, the present invention comprises:

A method for recognizing speech, comprising the steps of:

receiving an analog input signal corresponding to speech;

conditioning and measuring said input signal to provide a sequence of feature vectors at predetermined frame intervals;

comparing each said feature vector with each of a plurality of reference vectors, said reference vectors being organized in sequences, each said reference vector sequence corresponding to a word which can be recognized, to provide a distance measure with respect to each of said reference vectors for each successive one of said feature vectors; and recognizing words in accordance with said distance measures between each said sequence of said reference vectors and successive ones in said sequence of feature vectors;

each said sequence of reference vectors having a mask vector stored therewith, said distance measure ignoring elements of each said reference vector which are designated as "don't care" bits by said mask vector.

BRIEF DESCRIPTION OF THE DRAWINGS

The present invention will be described with reference to the accompanying drawings, wherein:

FIG. 1b is a graphical representation of an analog speech signal with respect to time after initial conditioning thereof, but prior to zero-crossing detection in the word recognizer of FIG. 1a;

FIG. 1c is a schematic representation of the speech signal of FIG. 1b, following its subjection to zero-crossing detection, in the word recognizer of FIG. 1a;

DESCRIPTION OF THE PREFERRED EMBODIMENTS

The present invention includes several points of novelty, and also can be implemented in numerous different ways. Thus, the following description will suggest a number of modifications and variations of the present invention, without thereby implying that the present invention is limited to any specific embodiments thereof.

Figure 1A:
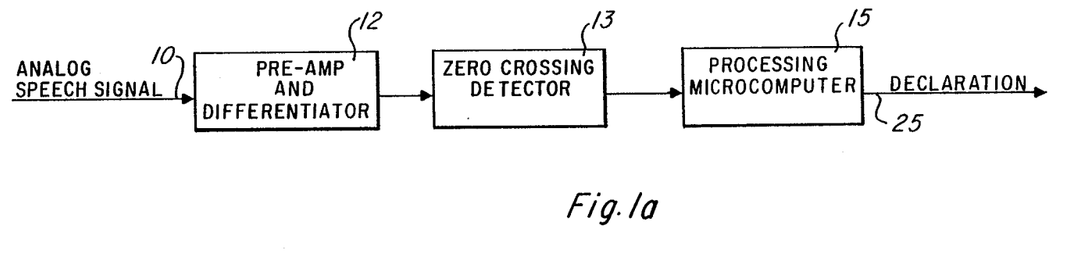
FIG. 1a shows a block diagram of a word recognizer in accordance with the present invention.
Figure 1B:
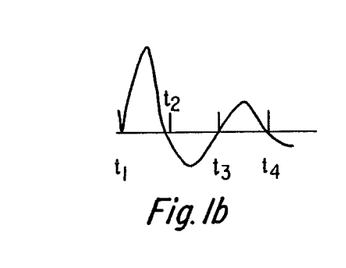

FIG. 1a shows generally the organization of the operations used in the word recognizer of the present invention. That is, a raw speech waveform 10 in the form of an analog speech signal is first subjected to signal conditioning including extremely simple prefiltering operations, e.g. to reject out of band signals, and wherein a pre-amplifier and an analog differentiator 12 may further act upon the analog speech signal 10. The speech signal may then generally take the form of the waveform illustrated in FIG. 1b. In the latter respect, it will be observed from FIG. 1b that the analog signal is generally sinusoidal and traces an undulating path above and below a "zero" polarity axis during the entire time duration including the respective time instants $t_1$, $t_2$, $t_3$, and $t_4$. The time instants $t_2$, $t_3$, and $t_4$ identify the zero-crossings of the waveform illustrated in FIG. 1b in which a transition occurs in the polarity sign of the waveform. Thus, the time instant $t_2$ identifies the zero-crossing of the waveform as it moves from a "plus" polarity to a "minus" polarity; $t_3$ identifies the zero-crossing of the waveform as it moves from a "minus" polarity to a "plus" polarity; and $t_4$ identifies the zero-crossing of the waveform as it moves from a "plus" polarity to a "minus" polarity.

Figure 1C:
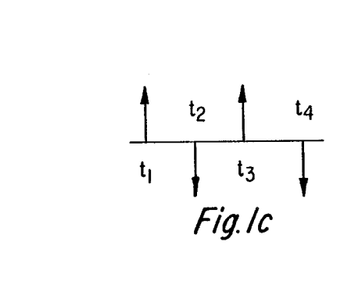

Signal conditioning on the analog speech signal continues by monitoring the pre-amplified and differentiated speech signal with a zero-crossing detector 13 to sense each zero-crossing of the speech signal. The zero-crossing detector 13 duly counts each polarity transition in the speech signal and assigns a time instant when each such zero-crossing occurs. FIG. 1c schematically represents the speech signal of FIG. 1b, by indicating the signal polarity at each of the time instants $t_1$, $t_2$, $t_3$, and $t_4$ as sensed by the zero-crossing detector 13.

After the signal conditioning effectd by the pre-amplifier and analog differentiator 12, and the zero-crossing detector 13, the conditioned speech signal is exposed to a signal processing unit 15, which may take the form of a microcomputer, for further signal processing to enable electronic word recognition of the analog input speech signal 10 to take place. Word recognition is generally indicated by the declaration output 25 from the microcomputer 15 as determined by the decision logic thereof. In the latter respect, referring to FIG. 2, the signal processing unit 15 is illustrated with dashed lines and includes a feature extractor 14 which receives the conditioned speech signal as an input. The feature extractor 14, in the presently preferred embodiment, simply measures the intervals between zero crossings of the digital wave form received from the signal conditioner 12, 13, and then simply sorts the various zero crossing interval measurements received during any one frame into bins, to provide an integer feature vector which gives a rough measurement of frequency distribution during that frame. The elements of the integer feature vector are then compared with various thresholds, to provide a binary feature vector. This provides the basic feature measurement. Note that no digital-to-analog conversion is required.

Figure 2:
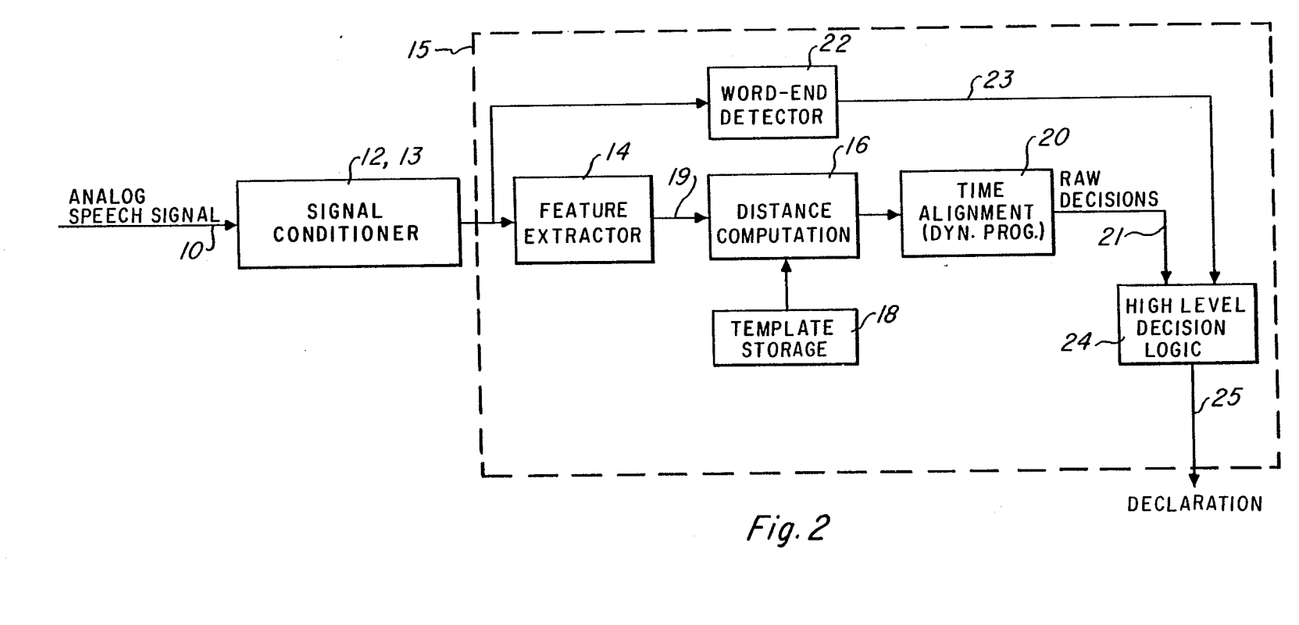
FIG. 2 is a block diagram of a preferred hardware implementation of the word recognizer according to the present invention.

The distance measurement 16 then compares the feature vector provided by the feature extractor 14 as an output along the line 19 with the feature vector received from a template storage portion 18. It is important to note two key features of the invention at this time. First, the storage 18 contains not only a feature vector for each template but also a mask vector. The mask vector is used to introduce don't care weightings into the feature vector stored with each reference template, as will be discussed below. Thus, the set of features of an input frame on which comparison for recognition is performed is selected, and can vary for each frame of each word template. Note that the various word templates stored in storage 18 each comprise a sequence of frames. That is, in a typical case each word template might comprise a sequence of 8–12 frames. (Each of the reference frames is expected to correspond to 2 of the 20 millisecond input frames, but can be warped to correspond to only one of the frames or to as many as 4 of the input frames, as described below.) The time alignment operation 20 selects the best match of each of the reference templates to the current input frame sequence, and provides running measurements of the raw match as output. A word end detector 22 also provides along line 23 the input to high level decision logic 24, and the word end measurement, together with the running cumulative word fit provided by the time alignment block 20, provide the bsis for the high level decision logic 24 to make the word recognition decision which is provided as a declaration output 25.

The operation of these various components of the invention will now be discussed in greater detail. The speech signal 10, which is typically raw analog input from a microphone (and typically a preamplifier) is provided to a signal conditioner 12, 13.

The filter functions preferably performed by the signal conditioner 12, 13 include only an extremely simple filtering operation. In the presently preferred embodiment, the signal conditioner 12, 13 comprises a low pass filter with a corner frequency of 6.25 KHz to reject out of band signals an analog differentiator, and a Schmitt trigger. The differentiator effectively emphasizes the high frequency components in the input signal. That is, the zero crossing characteristics of a signal can easily be dominated by a strong low frequency component, and the use of the first derivative as the function on which zero crossing analysis is performed minimizes this problem.

It should be noted that the filtering functions are not necessarily so minimal. In particular, the zero crossing characteristics of a speech signal are highly sensitive to the frequency preemphasis and also to the phase shifting introduced by a prefiltering section, and a wide variety of prefiltering characteristics may optionally be used, e.g., to provide a more critical distinction between the words in a given vocabulary set or to reject particular noise characteristics. that is, the prefiltering characteristics will substantially affect the extent to which perceptually distinct input frames are measurably distinct in the very limited information provided by the recognition algorithm of the present invention. A wide variety of such filtering characteristics could be introduced in modifications and variations of the present invention, but the principal embodiment of the present invention uses only simple processing functions as noted.

In addition, bandpass filtering can also be used in the signal conditioner, to reject out of band signals, although this is not used in the presently preferred embodiment.

It should be noted that the Schmitt trigger performs a rather important signal processing function, namely center-clipping. That is, where zero crossings to a function including noise are being measured, even a very low noise power, at moments when the function value is near zero, can introduce many spurious zero crossings. To avoid this problem in recognition, center-clipping (using the hysteresis characteristics of the Schmitt trigger) in effect ignores zero crossings unless the waveform reaches a certain minimum value between two adjacent zero crossings. Although a Schmitt trigger is not the only way to accomplish this center-clipping, some such function in the signal conditioner is highly desirable, since it greatly reduces the noise in the low-interval zero crossings.

The actual zero crossing information can be obtained in a variety of ways, as is obvious to those skilled in the art. For example, the analog input signal can be applied to the Schmitt trigger mentioned, or to a polarity sensing saturated output amplifier, to provide a strongly clipped signal, i.e., a sequence of rectangular waveforms of alternating sign. These waveforms can then be converted to logic levels and provided as inputs to a microcomputer which counts the duration of each rectangular waveform portion (that is, the duration of each interval between zero crossings) in terms of clock cycles of the microcomputer. Of course, this function could easily be embodied in SSI logic, with a flip-flop and counters, or otherwise, but the embodiment in a microprocessor or microcomputer is preferred. The clock resolution of the microporcessor is preferably plus or minus 40 microseconds or less, but most commercial microprocessors can meet this. For example, an 8080, a Z-80, or a TMS 7000 would all be suitable.

The next step in processing the speech signal is to generate counts of the zero-crossing interval distribution in each frame of a sequence of frames, spaced at a frame period. In the presently preferred embodiment, the frame period is 20 msec, but this frame period can easily be varied. If a longer frame period is used, rapid speech may not be well recognized, but this may be an acceptable tradeoff in some applications for the sake of lower processor load. Similarly, a shorter frame period imposes a higher processor load, but provides a relatively slight gain in performance. Thus, frame periods in the range of 1 to 200 msec are within the scope of the present invention.

It should be noted that the input is not necessarily even divided into frames prior to this stage. That is, an advantage of using a microprocessor to measure the zero crossing intervals is that the microprocessor can at the same time impose the initial division of the analog input signal into frames.

At each frame, a feature vector is generated from the input as follows: first, the RMS energy of the analog signal is measured over an interval which need not exactly coincide with the frame period. For example, in the presently preferred embodiment, the energy is measured over an analysis window of 30 msec. This provides some smoothing of the energy values between frames, and precludes missing short high-energy events. In addition, the zero crossing intervals are classified at this time. Again, the analysis window over which the characteristics of the zero crossings are measured need not be exactly the same as the frame period, and is 30 msec in the presently preferred embodiment.

Thus, to generate the feature vector, the zero crossing intervals of the analog waveform over a 30 msec interval are examined. The presently preferred method of extracting a feature vector from the multiple zero crossing interval numbers is as follows, but of course a wide range of other expedients could be used to provide a feature vector representative of the distribution of zero crossing intervals. In the presently preferred embodiment, the zero crossing intervals within the 30 msec analysis waveform are sorted into four "bins", where each bin generally corresponds to a bandpass filter. That is, bin 1 counts the number of zero crossing intervals within the analysis window which have durations between seven and 13 samples (one sample is equal to 80 microseconds in this embodiment); bin 2 counts the number of zero crossing intervals in the analysis window with a duration between four and six intervals; bin 3 counts the number of zero crossing intervals in the analysis window with a duration of two or three samples; and bin 4 counts the number of zero crossing intervals in the analysis window which have a duration of one sample. These numbers are preferably accumulated by the microcomputer as the clipped rectangular waaveform is received, so that the actual durations of the various zero crossings need not be stored at any point. That is, when the clipped input waveform changes sign, the microcomputer preferably notes the number of clock pulses since the last chnage of sign, increments the count in the appropriate bin by one, and resets its count register and begins to count the number of clock pulses until the next zero crossing. Thus, the number of zero crossings counted in any one "bin" corresponds generally to the energy which would have been measured through a corresponding bandpass filter, and the distribution over all of the bins provides an analog feature vector, which in the presently preferred embodiment includes four analog numbers.

Next, this integer feature vector is converted to a binary feature vector as follows. For example, the count found in bin 3 is compared to two thresholds to generate elements five and six of the binary feature vector: if the count is greater than a threshold B3L, then element 5 of the binary feature vector is set at 1 (and otherwise remains at zero); if the count in bin 3 is less than a second threshold B3U, then a 1 is entered in element 6 of the binary feature vector, which also otherwise remains at zero). That is, each bin has lower and upper thresholds, which are empirically chosen to maximize the discrimination between words used. In the presently preferred embodiment, the eight thresholds used, expressed in number of sample values, are:

| Bin number | Lower threshold | Upper Threshold |
|---|---|---|
| 1 | 1 | 4 |
| 2 | 4 | 8 |
| 3 | 8 | 16 |
| 4 | 16 | 32 |

Again, it should be noted that the presently operational embodiment has used very frequent high density resolution sampling as an initial step, and hence the zero crossing intervals are expressed in samples, but the contemplated best mode of the present invention would not use such expensive high-rate high-resolution sampling, and would use analog stages initially instead, as discussed above.

Thus, the foregoing process has produced a feature vector (eight bits in the presently preferred embodiment) for each frame of the input signal. This feature vector is compared with various reference vectors according to a distance measure, and word recognition is made in accordance with the sequence of distance measures between the sequence of reference vectors in a word template and all or some of the sequence of input feature vectors received.

The distance measure used is essentially a Hamming distance measure between the input frame and any particular reference frame, but there is one important additional point of novelty in the distance measure. A mask vector is preferably stored along with each reference vector, to mask the less significant elements of the reference vectors. Thus, the actual template for a word consists of a sequence of *pairs* of binary vectors: for each reference frame in the word template, both a reference feature vector and a mask vector are stored. For example, if the fourth element of a mask vector is 1, then the fourth element of the corresponding reference vector is used in the distance computation. If the mask vector element is zero, the corresponding element of the associated reference vector is not used in the distance computation. Thus, the distance between the test feature vector TF, and the i-th reference vector RF(i) and mask vector RM(i) is defined by the following logical operation:

$$D_{TF,i} = \text{Hamming} (RM(i) \cdot \text{and} \cdot (TF \cdot xor \cdot RF(i))).$$

Thus, $D_{TF,i}$ is the Hamming distance between the test vector TF and the i vector set of the template for the given word. This distance indicates the number of similarities between test feature vector TF and reference vector RF(i), with masking defined by the zero valued elements in the mask vector RM(i).

It should be recognized that this use of a mask vector to exclude insignificant components of each reference vector is broadly novel, and may be modified and varied widely. For example, it is not strictly necessary that the feature and reference vectors be binary, since a binary masking value may be used to mask the results of an analog subtraction step as well. In fact, it is not even strictly necessary that the mask vector itself be binary, although this is greatly preferable. If the mask vector is allowed to take on analog values, then it functions essentially as a weight vector. A weighting vector is still useful for disregarding insignificant bits in a recognition comparison, but an analog weighting vector does not offer nearly the computational efficiency which is provided by a binary mask vector. Moreover, preparation of a binary mask vector for a given word recognition set can be performed very simply and efficiently, as will be described below.

In addition, it should be noted that the novelty in the use of a masking vector is not by any means limited to use of an eight-bit feature vector, nor to recognition applications where the essential feature vector extraction step is based on zero crossing intervals, but can be applied to any speech recognition system whatsoever.

The method by which the reference vectors in a word template are generated will now be described.

To construct a template, the starting point is a large number of independent samples of that word as pronounced by a population which is sufficiently diverse to approximate that whose speech the recognizer will be required to recognize. For example, if the speech recognizer in use will be exposed to spoken inputs from men, women and children having all of the common regional accents, then the initial data base should also be obtained from men, women, and children, and should also include as many as possible of the regional accent types which must be recognized in use.

Correspondingly, if the recognizer is to be operated in a speaker-dependent mode or is to be customized for a small group of speakers, the number of samples must remain large, but the speakers within the relevant set will be proportionately represented. For example, if four speakers are to be recognized, each should contribute an average of 25 samples to the data base.

Figure 5:
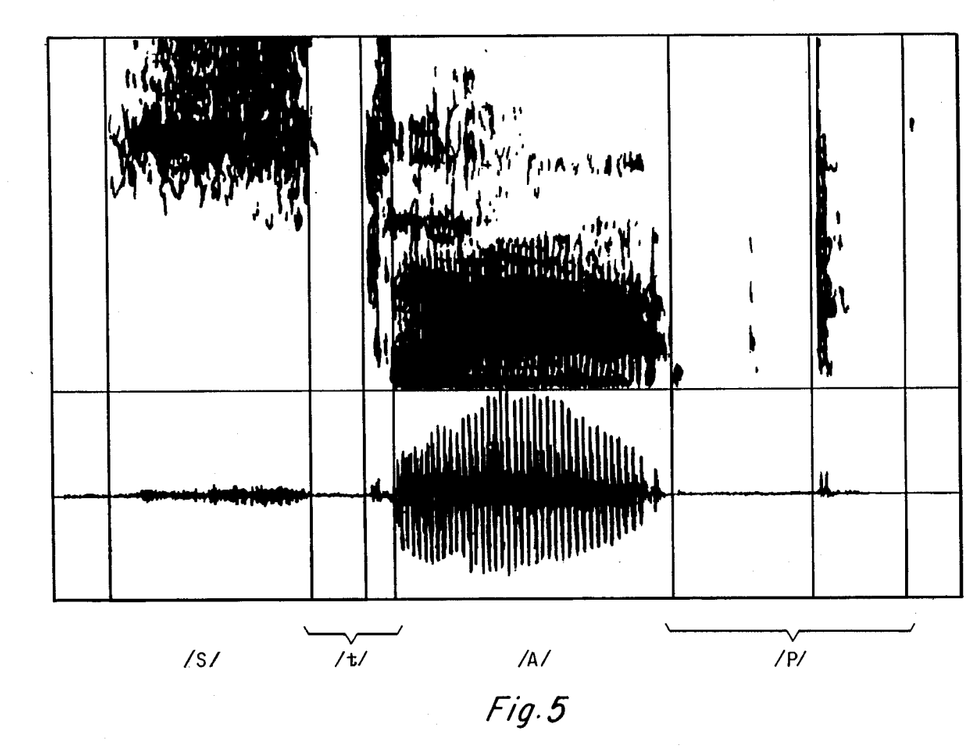
FIG. 5 shows an example of the classification of a speech input according to its acoustic segmentation.

The first step is a manual classification step. Suppose that a template is to be constructed for the word "stop". This word has six distinct acoustic segments as shown in the spectrogram of FIG. 5. These are the initial sibilant /s/, stop and release /t/, vowel portion /A/, and the final stop and release /p/. These six segments are preferably marked interactively, with the aid of spectrogram and waveform plots, on graphics terminals, for each sample in the data base. Thus, this step manually establishes the location of corresponding acoustic segments within the data base sampled. This step is used because various speakers will vary the relative length of different acoustic segments within a word, and it is necessary, when estimating from the data sample what feature vector would correspond to a vowel /A/, that the computation not be distorted by time-warped samples in which the speaker was actually pronouncing a /t/ or a /p/. Of course, this time-alignment of the samples in the data base could be accomplished other ways, including automatic classification of the samples by acoustic segment boundaries according to, e.g., LPC characteristics, but the presently preferred embodiment uses manual classification at this step.

Thus, after this manual classification step, the segment within each sample in the data base which corresponds to the successive acoustic segments which must be included in the reference vector has been established. The average duration of each of the acoustic segments is then computed to establish the number of reference frames needed in each segment. For example, suppose the sibilant /s/ has an average duration of 130 msec. Then, at a reference frame period of 40 msec., three reference frames in the word template will correspond to the sibilant /s/. (The period of the reference frame in the presently preferred embodiment is exactly twice as long as the frame interval in the input speech, for reasons which will be discussed below.)

The next step is to locate, in each of the 100 samples, which portions of the sample shall be included in the computation of the expected characteristics of each of the three reference frames in the word template which are to correspond to the sibilant /s/. That is, in this example the three /s/ reference feature vectors would be computed based on measurements at three points evenly spaced within the duration of the phoneme /s/, for each sample in the data base. Thus, the result of this process is that, for each frame in the word template or which a reference vector must be computed, a unique location within each sample in the data base to correspond to that frame has been identified.

Figure 4:
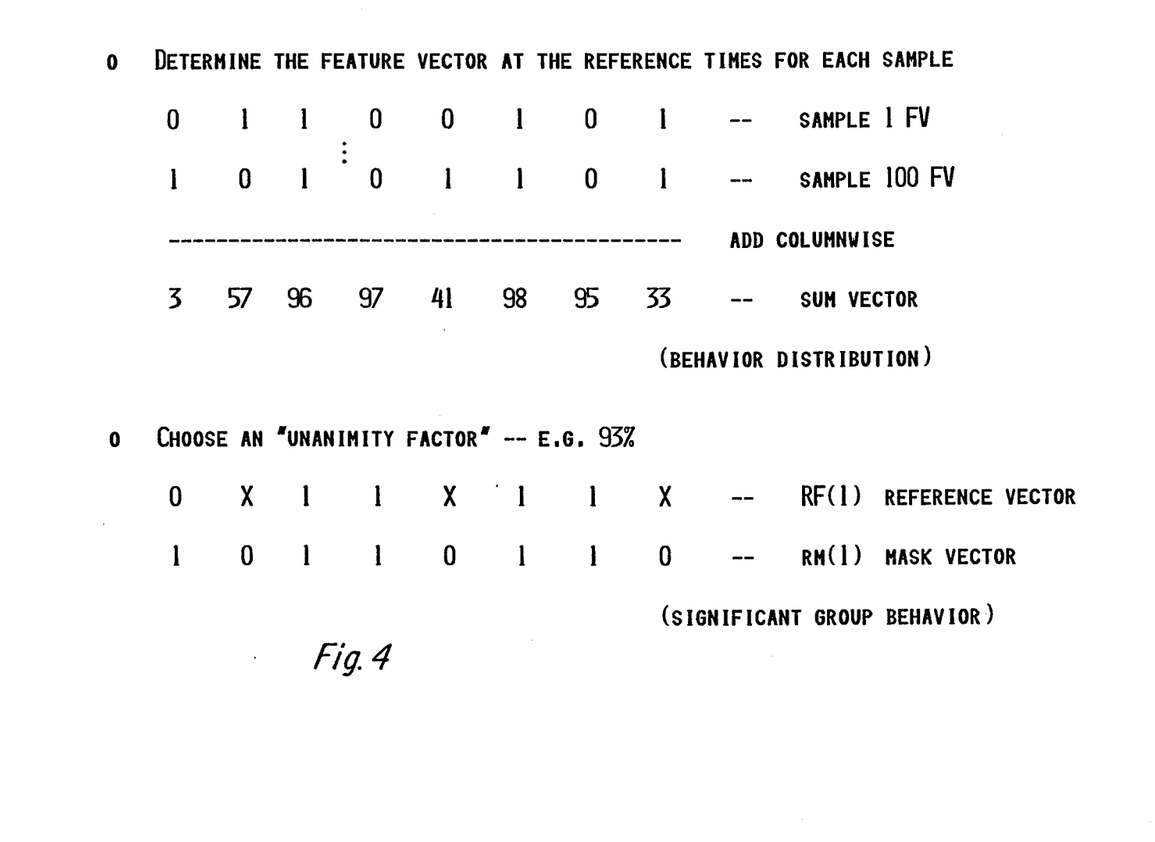
FIG. 4 is a schematic indication of the processing of raw speaker inputs to achieve a mask vector for a reference template set, according to an empirical unanimity factor.

By way of example, FIG. 4 generally illustrates the process by which each reference vector in the word template is computed, based on the corresponding portions of the various samples in the data base. First, a tolerance number called a unanimity factor (nu) is chosen emperically. In the presently preferred embodiment nu is set equal to 0.93, but may be greater or lesser depending on the uniformity of the speakers in the data base, and to some extent on the size of the data base. However, in the presently preferred embodiment, a value greater than 90% is preferably used, and is preferably in the range of 90 to 97%.

The unanimity factur nu tells how many disagreements can be tolerated on any particular bit of the feature vector for corresponding frames before concluding that there is no concurrence of behavior over the population. That is, for example, suppose that nu is chosen equal to 0.93. In this case, if 93 or more of 100 samples in the data base have a value for the first analog parameter (at corresponding frame locations) which is larger than B1L, then the first elements of the reference feature vector and of the mask vector are set equal to 1. If 93 or more of the samples have a value for the first parameter which is below B1L, then the first element of the reference feature vector is 0 and the first element of the mask vector is 1. That is, in this case the population would have agreed that the general behavior is to have the number of zero crossing intervals in the first "bin"-less than the threshold B1L. However, if less than 93 samples agree in this respect, then the first element of the mask vector is set equal to zero, and the first element of the reference vector is a "don't care" value and can be 0 or 1.

Thus, this process genertes a word template which is a time ordered sequence of vector pairs, namely a feature vector and a mask vector at each reference frame interval.

The basic distance measure, which compares *one* frame of speech input to some *one* frame of a word template has been described above. However, the word identification rests not merely on testing the identity of frame to frame, but rather on finding the similarity of a sequence of input frames to the sequence of reference vectors in a word template. In the presently preferred embodiment, a dynamic programming technique is used to find an optimal subsequence match between the sequence of reference vectors in the word template and a subsequence of feature vectors in the speech input. This dynamic programming algorithm permits time-warping by various speakers to be accommodated, but also has other advantages. In particular, the end points can be unconstrained. That is, no separate decision step needs to be made as to which frame in an input sequence of frames the end point of the word template should be identified to. Moreover, a second advantage of this approach is that the storage requirements are reduced, since the reference frame interval is twice the frame interval imposed on the speech input signal. In general, the unconstrained end point approach is accomplished by providing a cumulative cost profile, for each point in time, which assumes that the current input frame is the last frame. However, to economize on processor time, the preferred embodiment uses an end-of-word window instead, as will be discussed below.

Thus, the foregoing steps produce a scalar dissimilarity measure $D_{N,j}$ which shows the dissimilarity between an input frame j and a reference frame N. This dissimilarity measure is then transformed, through a dynamic programming procedure, into a minimal subsequence distance measure (scanning error) $E_{N,j}$, which is preferably defined as follows:

$$E_{Nj} = D_{Nj} + \min\{E_{N-1,j-1} + k, E_{N-1,j-2}, E_{N-1,j-3} + \frac{k}{3},$$

$$E_{N-1,j-4} + k\}.$$

The quantity "K" is a constant which is optionally used to impose a warping penalty. That is, the expected ratio of reference frames to sample frames is one reference frame to every two sample frames. However, if this is not in fact the actual spacing, then a penalty amount is added to the minimal subsequence distance for every reference in which the local ratio of input frames to reference frames is different from 2-1. Note that the penalty added where the ratio is locally 3-1 is much smaller than that imposed where the ratio is locally 4-1 or 1-1. Thus, only a modest penalty is added where the input speech is slightly slower than the reference speech rate (down to 1½ times as slow), but a substantially larger penalty is added if the input speech is faster than the reference speech, or is more than 1½ times as slow as the rate affected by the reference speech.

That is, where input frames are matched to reference frames at an average rate which is between 2-1 and 3-1, and where the time distribution of the input frame is the same as that of the reference frame, then the particular mappings of reference frame onto input frame within the optimal subsequence will vary between every other input frame and every third input frame, and the total speed-mismatch penalty will be a linear function of the speech rate mismatch. However, where the warping of the input sample is sufficiently nonliner that, within the optimal subsequence, some adjacent pairs of the reference template sequence match either adjacent input frames or to input frames which are separated by three other input frames, an additional penalty will be added to the smooth penalty for linear warping. This additional penalty may be referred to as a nonlinear warping penalty, although it should be noted that nonlinear warping is penalized only if it causes some *local* portion of the reference-to-input mapping to be denser than 1-2 or sparser than 1-3. Thus, this warping penalty incorporates speech-rate information into the recognition process, but does not require large additional amounts of computation time.

The warping penalty is optional, and is not strictly necessary for practicing the present invention. That is, the iterative statement of the dynamic programming measure can be restated as $$E_{Nj} = D_{Nj} + \min_{k \in [1,4]} \{E_{N-1, j-k}\}$$

The presently preferred embodiment does not use warping penalties to minimize the computational load.

Alternatively, a larger than 2-to-1 warping factor can be permitted, or a sparser ratio of reference templates to input frames could be used, as desired. The warping penalties can accordingly be widely varied.

The foregoing dynamic programming procedure can provide a cumulative fit measure for each word in the vocabulary, at each input frame interval. In this case, the recognizer is capable of operating in a connected-speech recognition mode rather than an isolated-speech recognition mode.

However, this imposes a heavy additional processing load and is not the preferred embodiment of the invention.

Figure 3:
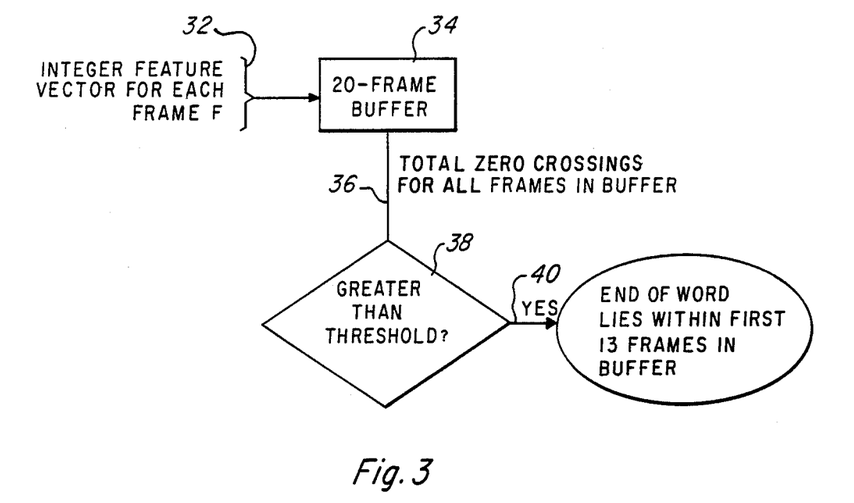
FIG. 3 is a schematic diagram indicative of the end of word window operation used to identify word endings in a preferred embodiment of the present invention.

That is, the processing load required to find a cumulative optimal subsequence match at each input frame interval is too much for the economical implementations at which the present invention is especially directed. To reduce this processing load, words are preferably recognized only at word ending points identified by an end-of-word detector. The operation of the end-of-word detector will now be described with reference to FIG. 3. The end-of-word operation as depicted in FIG. 3 provides the integer feature vector 32 for each frame of input speech as an input to a plural frame buffer memory 34, which may include storage for 20 frames of speech data, for example.

In the presently preferred embodiment, the zero crossings are not only sorted into bins, but a count is kept of the total number of zero crossings. For example, this can be done by adding together the counts in the various bins of the integer feature vector, depending on the bin threshold values. Alternatively, this can be done by simply keeping a direct running count of the number of zero crossings, and holding this as a directly computed parameter during each frame of input speech. A further alternative is simply to count the number of high-frequency zero crossings for each frame, and sum those across frames as at 36.

The key test which is implemented in the end-of-word decision of this aspect of the present invention is to ascertain whether the number of zero crossings exceeds a given threshold number as at 38 during a reasonably long period of time (e.g. 300 milliseconds. If the threshold number is exceeded as at 40, this large number of zero crossings indicates that no low-frequency energy, and therefore presumably no speech, is present during this 300 millisecond window. It should be noted that this is somewhat sensitive to the bias level used in the Schmitt trigger (or other center-clipping mechanism). That is, if the bias level in the Schmitt trigger is set too high, then noise at the end of a word, in a quiet environment, will not be able to produce the high number of zero crossings required for the detection of end of word. Correspondingly, if the bias level is too low, a long unvoiced consonant (such as the s at the end of a word such as "guess") may generate enough high-frequency zero crossings to trigger the end of word detector erroneously.

Thus, the end-of-word detector selectively indicates that an end-of-word has occurred. If so, then word recognition is performed on the assumption that the word will have ended during a second window period, which is not necessarily the same window over which the end-of-word operates. That is, in the presently preferred embodiment, an end-of-word is detected when 300 milliseconds have occurred without input speech energy, and the first 200 milliseconds of the 300 millisecond end-of-word detection window are then searched for a hypothetical word ending point. However, this second window, during which an end-of-word is looked for, can be the same as or different from the end-of-word detection window, and can be varied within very broad parameters. In the example shown in FIG. 3 the end-of-word detection lies within the first 13 frames of speech data included in the 20-frame buffer memory 34. The essential trade-off here is that, if the recognition window is made smaller, the processor load is reduced but the frequency of non-recognition errors is likely to be increased.

The invention as presently practiced is embodied in a VAX 11/780, with analog input and output connections (i.e., microphone, preamplifier, analog-to-digital converter, digital-to-analog converter, audio amplifier and loudspeaker), and is implemented in the Fortran code inthe attached appendix which is hereby incorporated by reference. However, as discussed above, the present invention can be implemented in a cheap micro-computer system, and the contemplated best modes of the invention in the future are expected to be microprocessor or microcomputer embodiments.

In particular, an embodiment of the present invention in an 8-bit microprocessor system is believed to be straight-forward. No expensive data converter chip or means for energy measurement is required. The only analog stages needed, in the preferred embodiment are the low-pass filter, differentiator, and Schmitt trigger. If the present invention is embodied in a 16-bit system, the additional processing power and word length will mean simply that a slightly larger vocabulary can be accommodated, and will also make development of the vocabulary templates slightly easier.

As will be obvious to those skilled in the art, the present invention provides numerous broad points of novelty over the prior art of speech recognition. Therefore, the scope of the present invention can be embodied in numerous modifications and variations and is not limited as specified in the accompanying claims.

What is claimed is:

1. A word recognition system for identifying a spoken word represented by an analog speech signal, said word recognition system comprising:

signal processing means for receiving an analog input speech signal and for producing feature vectors from the input speech signal to provide a sequence of feature vectors at predetermined speech frame intervals as an output therefrom;

memory means storing a plurality of reference templates of digital speech data respectively representative of individual words and comprising the vocabulary of the word recognition system, each of said reference templates being defined by a predetermined plurality of reference vectors arranged in a predetermined sequence and comprising an acoustic description of an individual word in a time-ordered sequence, each of said reference templates being further defined by at least one mask vector respectively associated with each said sequence of reference templates being further defined by at least one mask vector respectively associated with each said sequence of reference vectors and being indicative of the significance of portions of the reference vector sequence association therewith in establishing the identity of the word represented by the reference template of which said at least one mask vector is a component;

means operably associated with said signal processing means for comparing each feature vector of said input speech signal with the corresponding reference vectors of each of said reference templates to provide a distance measure with respect to each of the feature vectors and the predetermined reference vector sequences defining acoustic descriptions of the respective words included in the vocabulary of the word recognition system, said comparing means being responsive to the status of the respective mask vectors comprising components of said plurality of reference templates to ignore elements of reference vectors included in respective reference templates which are indicated by the associated mask vector to be insignificant so as to provide said distance measure based upon significant elements of the reference vectors as included in the predetermined reference vector sequences; and word recognizing means operably associated with said comparing means for determining which one of the plurality of the reference templates is the closest match to said input speech signal based upon the distance measures of said reference vector sequences and successively received feature vectors corresponding to respective speech frames.

2. A word recognition system as set forth in claim 1, wherein said feature vectors are binary, and wherein said distance measure corresponds to a Hamming distance measure between said feature vector and a reference vector as modified in accordance with said at least one mask vector associated with the reference vector sequence of which said reference vector is a component.

3. A word recognition system as set forth in claim 1, wherein one mask vector is uniquely associated with each of said reference vectors such that each said reference template comprises a plurality of mask vectors corresponding in number to said predetermined plurality of reference vectors arranged in said predetermined sequence.

4. A word recognition system as set forth in claim 3, wherein each said mask vector is a binary vector comprising a plurality of bits, and each said reference vector is a binary vector comprising a plurality of bits, and each said mask vector has the same number of bits as the reference vector associated therewith, each of said reference templates representative of a word thereby comprising a sequence of pairs of binary vectors including a reference vector and a mask vector in each said pair of binary vectors.

5. A word recognitio system as set forth in claim 1, wherein each of said mask vectors is a binary vector comprising a plurality of bits, each of said bits of said mask vector selectively assuming alternative predetermined values respectively indicating that a corresponding portion of said reference vector sequence with which said mask vector is associated is either significant or insignificant in the determination of said distance measure in establishing the identity of the word represented by the reference template to which the reference vector sequence corresponds.

6. A word recognition system as set forth in claim 5, wherein one mask vector is uniquely associated with each of said reference vectors such that each said reference template comprises a plurality of mask vectors corresponding in number to said predetermined plurality of reference vectors arranged in said predetermined sequence.

7. A word recognition system as set forth in claim 1, wherein said signal processing means comprises signal conditioning means for receiving the analog input speech signal and performing filtering and signal processing operations thereon to place the input speech signal in a format compatible with the determination of the feature aspects thereof, and means operably coupled to the output of said signal conditioning means for extracting feature vectors from the conditioned input speech signal in providing said sequence of feature vectors;

said comparing means being operably associated with said feature vector extracting means of said signal processing means in comparing each said feature vector of said input speech signal with the corresponding reference vectors of each of said reference templates.

8. A word recognition system as set forth in claim 7, wherein said signal conditioning means is effective in performing filtering and signal processing operations on the analog input speech signal to produce a waveform sequence alternating between plus and minus polarity signs, said signal conditioning means further including a zero-crossing detector for counting the number of polarity transitions in the waveform sequence to obtain a zero-crossing count for each frame of the waveform sequence; and said feature vector-extracting means providing said sequence of feature vectors from said conditioned input speech signal at predetermined speech frame intervals based upon the time duration intervals between zero-crossings of the waveform sequence.

9. A word recognition system for identifying a spoken word represented by an analog speech signal, said word recognition system comprising:

signal conditioning means for receiving an analog input speech signal and performing filtering and signal processing operations thereon to place the input speech signal in a format compatible with the determination of feature aspects thereof;

means operably coupled to the output of said signal conditioning means for extracting feature vectors from said conditioned input speech signal to provide a sequence of feature vectors at predetermined speech frame intervals;

memory means storing a plurality of reference templates of digital speech data respectively representative of individual words and comprising the vocabulary of the word recognition system, each of said reference templates being defined by a predetermined plurality of reference vectors arranged in a predetermined sequence and comprising an acoustic description of an individual word in a time-ordered sequence, each of said reference templates being further defined by a plurality of mask vectors corresponding in number to said predetermined plurality of reference vectors and respectively associated with a corresponding reference vector of said plurality of reference vectors, each said mask vector being indicative of the significance of the reference vector associated therewith in establishing the identity of the word represented by the reference template in which the reference vector occurs;

means operably associated with said feature vector extracting means for comparing each feature vector of said input speech signal with the corresponding reference vectors of each of said reference templates to provide a distance measure with respect to each of said feature vectors and the predetermined reference vector sequences defining acoustic descriptions of the respective words included in the vocabulary of the word recognition system, said comparing means being responsive to the status of the respective mask vectors associated with the reference vectors to ignore elements of each said reference vector which are indicated by the associated mask vector corresponding thereto to be insignificant so as to provide said distance measure based upon significant elements of the reference vectors as included in the predetermined reference vector sequences; and word recognition means for determining which one of the plurality of the reference templates is the closest match to said input speech signal based upon the distance measures between each of said reference vector sequences and successively received feature vectors corresponding to respective speech frames.

10. A method for recognizing speech comprising:
receiving an analog input speech signal;
processing said analog input speech signal to provide a sequence of feature vectors from said input speech signal at predetermined speech frame intervals;
associating at least one mask vector with each sequence of a plurality of reference vectors which have been organized in sequence with each of said reference vector sequences corresponding to a word which can be recognized, with said mask vector being indicative of the significance of portions of the reference vector sequence with which it is associated in establishing the identity of the word to which the respective reference vector sequence corresponds;
comparing each of said feature vectors with each of said plurality of reference vectors in relation to the status of the respective mask vector associated with each said reference vector sequence;
determining a distance measure with respect to each of said reference vectors for each successive feature vector in said sequence of feature vectors in response to the comparison therebetween wherein portions of each said reference vector sequence indicated by the associated at least one mask vector corresponding thereto to be insignificant are ignored such that said distance measure is based upon significant portions of the reference vector sequence; and
recognizing words in accordance with the distance measures between each of said reference vector sequences and successively received feature vectors corresponding to respective speech frames.

11. A method as set forth in claim 10, wherein said feature vectors, said reference vectors and said mask vectors are binary, and wherein said distance measure-determining step comprises a Hamming distance measurement between said feature vector and a corresponding reference vector as modified in accordance with a respective mask vector associated therewith.

12. A method as set forth in claim 11, wherein a plurality of mask vectors are respectively associated with said plurality of reference vectors arrangd in each said reference vector sequence such that one mask vector is uniquely associated with a corresponding one of said reference vectors included in each said reference vector sequence.

13. A method as set forth in claim 12, wherein the comparison of each of said feature vectors with each of said plurality of reference vectors organized in reference vector sequences is responsive to the status of the respective mask vectors associated with the reference vectors so as to ignore elements of each said reference vector indicated by the associated mask vector corresponding thereto to be insignificant.

14. A method for recognizing speech comprising:
receiving an analog input speech signal;
conditioning said analog speech signal to produce a sequence of rectangular waveforms of polarity signs alternating between plus and minus polarities as a digital waveform signal;
counting the number of polarity transitions in the digital waveform signal to obtain a zero-crossing count for each frame of the digital waveform signal;
measuring the time duration intervals between zero-crossings of the digital waveform signal;
providing a sequence of binary feature vectors based upon the measurements of the time duration intervals between zero-crossings of the digital waveform signal and corresponding to respective frames of the digital waveform signal;
associating at least one mask vector with each sequence of a plurality of reference vectors which have been organized in sequences with each of said reference vector sequences corresponding to a word which can be recognized, wherein said at least one mask vector is indicative of the significance of portions of the reference vector sequence with which it is associated in establishing the identity of the word to which the respective reference vector sequence corresponds;
comparing each of said feature vectors with each of said plurality of reference vectors organized in sequences and said at least one mask vector associated therewith;
determining a distance measure with respect to each of said reference vectors for each successive feature vector in said sequence of said feature vectors in response to the comparison therebetween, wherein portions of each said reference vector sequence indicated by the associated at least one mask vector corresponding thereto as being insignificant are ignored such that said distance measure is based upon significant portions of the respective reference vector sequence; and
recognizing words in accordance with the distance measures between each of said reference vector sequences and successively received feature vectors corresponding to respective speech frames.

15. A method as set forth in claim 14, wherein a plurality of mask vectors are respectively associated with said plurality of reference vectors arranged in each said reference vector sequence such that one mask vector is uniquely associated with a corresponding one of said reference vectors included in each said reference vector sequence.

16. A word recognition system as set forth in claim 1, wherein each of said feature vectors, said reference vectors, and said mask vectors are binary vectors, one mask vector being uniquely associated with each of said reference vectors such that each said reference template is defined by a predetermined plurality of reference vectors and a plurality of mask vectors corresponding in number to said predetermined plurality of reference vectors;

each of said reference vectors and said mask vectors comprising respective pluralities of bits, and each said mask vector having the same number of bits as the reference vector associated therewith, each of said reference templates representative of a word thereby comprising a sequence of pairs of binary vectors including a reference vector and a mask vector in each said pair of binary vectors;

each of said bits of each said mask vector selectively assuming alternatively predetermined values respectively indicating that a corresponding bit of said binary reference vector included in the pari of binary vectors therewith is either significant or insignificant; and said distance measure corresponding to a Hamming distance measure between each of said feature vectors and a respective reference vector as modified in accordance with said mask vector included in said pair of binary vectors therewith such that said Hamming distance measure is determined only with respect to the significant bits of said reference vectors in establishing the indentity of the word represented by the feature vectors as determined by the reference template as defined by the sequence of pairs of binary vectors which is the closest match to said feature vectors.

* * * * *